United States Patent [19]
Delvalle

[11] 4,012,480
[45] Mar. 15, 1977

[54] ISOTOPIC ENRICHMENT OF URANIUM WITH RESPECT TO AN ISOTOPE

[75] Inventor: Pierre Delvalle, Juvisy sur Orge, France

[73] Assignee: Commissariat a l'Energie Atomique, Paris, France

[22] Filed: Feb. 22, 1974

[21] Appl. No.: 444,932

[30] Foreign Application Priority Data

Feb. 27, 1973 France .................. 73.06881

[52] U.S. Cl. .................. 423/10; 423/6; 423/7; 423/8; 423/9
[51] Int. Cl.² .................. C01G 43/00
[58] Field of Search .......... 423/7, 8, 10, 6, 9; 260/429.1

[56] References Cited

UNITED STATES PATENTS

| | | |
|---|---|---|
| 2,835,687 | 5/1958 | Clewett et al. .......... 260/429.1 |
| 3,511,620 | 5/1970 | Shimokawa et al. .......... 423/7 |
| 3,773,889 | 11/1973 | George et al. .......... 423/7 X |
| 3,869,536 | 3/1975 | James .......... 423/7 |
| 3,953,568 | 4/1976 | Seko et al. .......... 423/7 |

OTHER PUBLICATIONS

Bigeleisen, Nucl. Sci. Abs., 26, Abs. No. 47766 (1972).
Shimokawa et al II, Nucl. Sci. Abs., 24, Abs. No. 50456 (1970).

Primary Examiner—Edward A. Miller
Attorney, Agent, or Firm—W. R. Hulbert

[57] ABSTRACT

A process for chemical enrichment of uranium with respect to a lighter one of its isotopes. The process consists in contacting uranium of valence state III and uranium of valence state IV, or a compound of uranium of valence state III and a different compound of uranium of valence state III. One of the phases which are contacted or the only phase is liquid. The system should be substantially free of elements which would cause uranium III to oxidize to valence IV.

18 Claims, 11 Drawing Figures

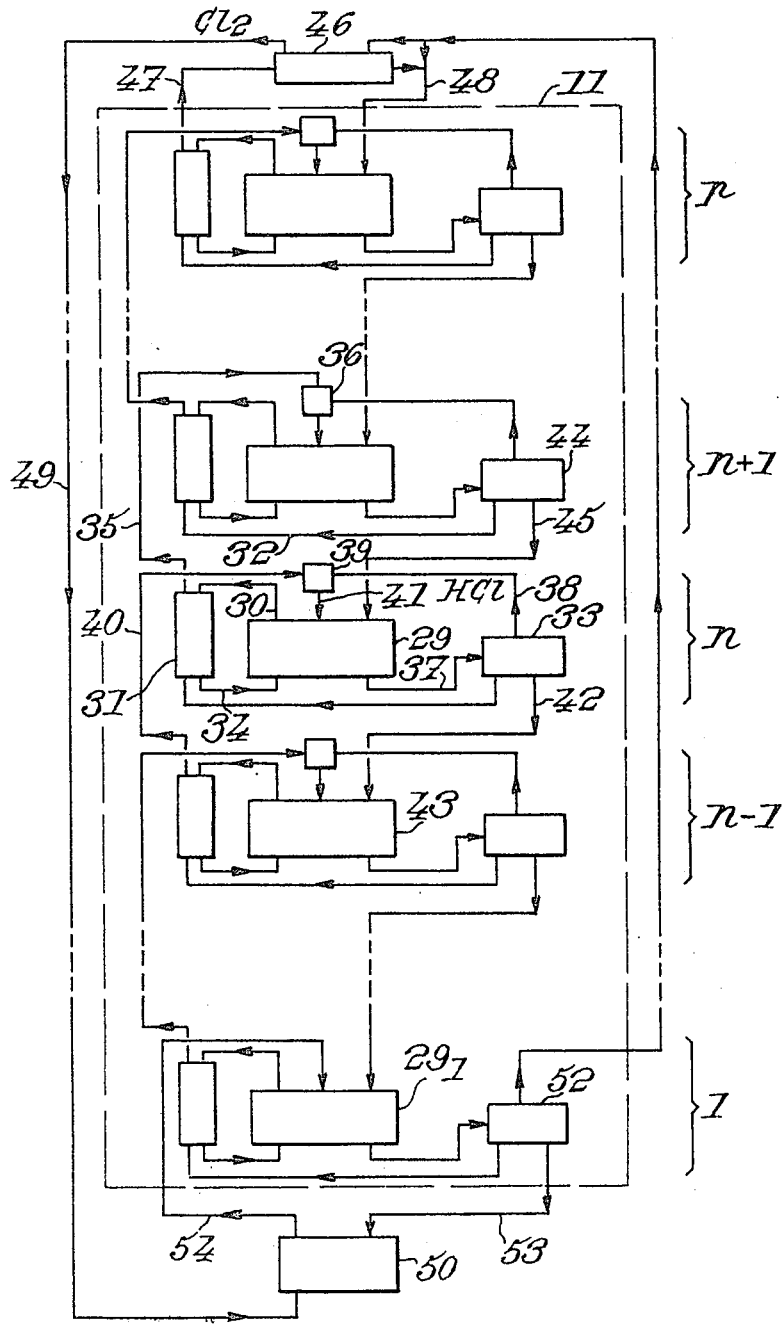

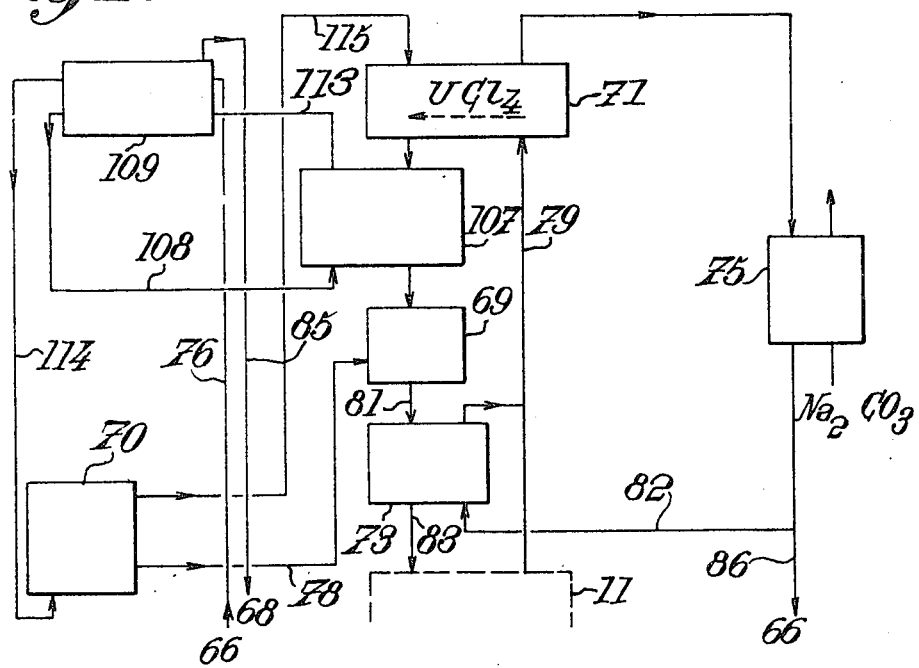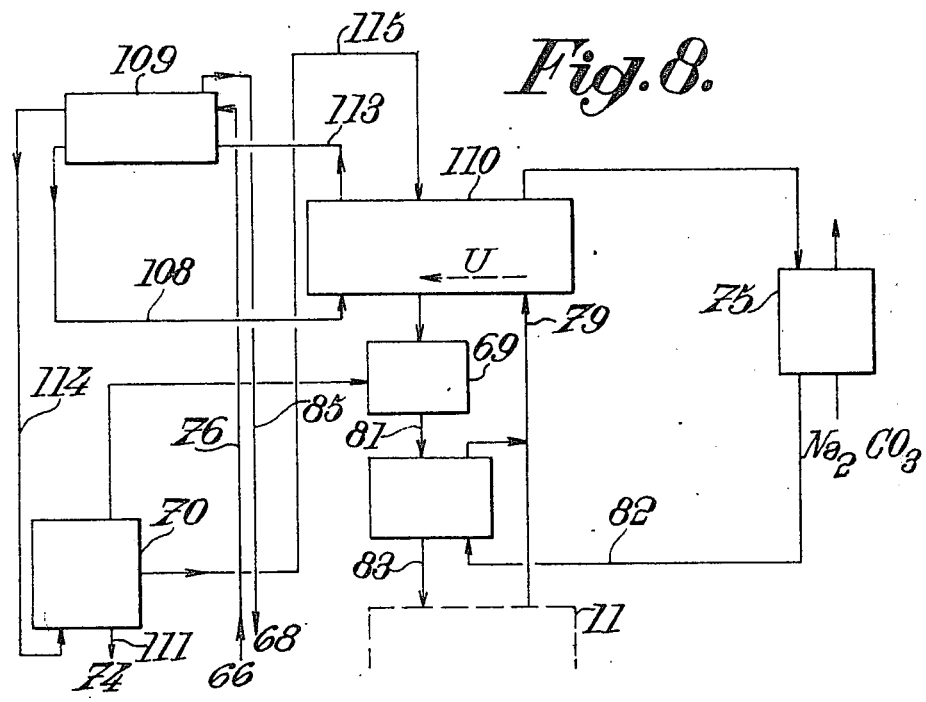

ISOTOPIC ENRICHMENT OF URANIUM WITH RESPECT TO AN ISOTOPE

BACKGROUND OF THE DISCLOSURE

The present invention relates in general to isotopic exchange by chemical route, for isotopic enrichment of uranium with respect to one particular isotope thereof.

As is known, isotopic enrichment of uranium has become or great importance and enrichment of natural uranium with respect to 235 U is of particular interest. Two methods of enrichment of natural uranium in isotope 235 are at the present time used industrially or are about to be so. These are gaseous diffusion and centrifugation. The two methods require the uranium to be in the form of the hexafluoride, that is to say in the form of a very corrosive gas, dangerous and difficult to handle. They are very complex and operation of the plants meets with considerable difficulties. The first method has additionally the drawback of a high consumption of energy. The second becomes of economic value only with a large inventory of centrifuges, requires enormous initial investments and is still not completely mastered.

On the other hand, there has been continuing interest in chemical methods of isotopic enrichment of uranium. Chemical exchange between ions of uranium of valence IV and uranium of valence VI, generally in the form of the uranyl ion, has been considerably studied. In particular, it has been proposed to effect isotopic exchange between $U^{+4}$ and $UO_2^{+2}$ in homogenous aqueous solution (for example in U.S. Pat. No. 2,787,587) or in aqueous and organic phases brought in contact (U.S. Pat. No. 2,835,687). It has also been proposed to use ion exchange resins which retain one of the isotopes selectively: for example, it has been proposed to fix uranium of valence IV on a resin, then to oxidize it and to elute it. On this subject, reference may be made to French Pat. Nos. 1,480,129, 1,600,437, 2,146,462 and 2,546,461.

While these methods have given some results, they have not achieved acceptance. First, the exchange factors per stage are low. Moreover, most of them require complex chemical operations.

Uranium is known to assume valences other than the valences IV and VI, which have been until now used in attempts of isotopic separation by the chemical route. SAITO has described in particular methods for the preparation of acid solutions of uranium salts of valence III (Bull. of the Chemical Society of Japan, 1967, Vol. 40, pp. 2107–2110). However, the $U^{+3}$ ions tend spontaneously to revert, especially in solution, to the state of uranous $U^{+4}$ ions or even uranyl $UO_2^{++}$ ions, which phenomenon has often been atributed to atmospheric air.

This re-oxydation in itself is not surprising if it is recalled that the system $U^{+3}U^{+4}$ forms an oxidation-reduction system whose normal potential is −0.63 volt with respect to a standard hydrogen electrode. The $U^{+3}$ ions have consequently a reducing character such that they should theoretically reduce the water thereby causing the formation of hydrogen.

It is an object of the invention to provide an isotopic exchange method by the chemical route improved with respect to those defined above, especially in that it gives high enrichment coefficients per stage, that it only uses relatively conventional equipment, easy to operate, that it enables the use of non-gaseous phases, preferably liquids, that the consumption of energy that it involves compares favorably with that required by the majority of known methods and, lastly, that it can be carried out in low capacity installations.

The invention makes use of the observation that it is possible to form solutions containing uranium in the valence III state and in which this valence state can be preserved in metastable manner, even in acid medium, for long durations, in particular sufficient to perform isotopic exchanges under industrial conditions, when these solutions are kept out of all contact with conducting bodies and when they are practically free - apart from the uranium - of metal ions other than the alkali metals and alkaline earth metals (or of groups III to VIII of the periodic classification).

It is clear that, even if the normal potential of the oxidation-reduction system $U^{+3}/U^{+4}$ mentioned above it left out from consideration, the species $U^{+3}$ cannot escape its oxidation number rising by at least one unit under the effect of metallic ions with a less reducing character contained in their common solutions. It was however entirely unknown that quantities, even very small, of other metallic ions of the above-indicated type with respect to the content of $U^{+3}$ ions of their common solutions had an effect which can be termed as catalytic with respect to the rapid oxidation of the $U^{+3}$ ions.

It was noted that it is possible, for each type of metallic ion of groups III to VIII of the periodic table (other than uranium), to determine experimentally the minimum proportions, called below "catalytic proportions" beyond which the rapid conversion of the $U^{+3}$ ions contained in the solutions concerned, into $U^{+4}$ ions is observed. These catalytic proportions are very low, for example of the order of one ppm (part per million) with respect to the uranium, for ions such as nickel, copper or cobalt.

When, in the remainder of this description, reference is made to solutions free of metallic ions of the type concerned, it must be understood that it relates to solutions whose contents of these ions are less than the corresponding catalytic proportions.

Not only the phase containing $U^{+3}$ must be practically free of certain ions, but any aqueous solution containing $U^{+3}$ must be kept out of contact with the electrically conducting walls. If, for example, an acid solution containing $U^{+3}$ is in contact with a conducting material, the latter can facilitate the reaction between $U^{+3}$ and $H^+$ (which is normally very slow in a pure homogeneous phase) by participating in the electron exchange between the two participants in the reaction. This phenomenon has a catalytic character and is more or less rapid according to the relative arrangement of the intensity - potential curves of the reactions, $U+^3 \rightarrow U+^4$ and $H+ \rightarrow H_2$ in the material concerned. In particular, the phenomenon will be all the faster as the overvoltage of the hydrogen to this material is lower.

A process according to one aspect of the invention for effecting uranium isotopic exchange, comprises contacting uranium of valence state III and uranium of valence state IV, uranium being present in at least one of said valences in a liquid phase, under conditions which substantially prevent uranium of valence state III from rapidly oxidizing from valence state III to valence state IV.

In a preferred embodiment of the invention, the process comprises forming an aqueous phase containing hypo-uranous ions $U^{+3}$, the contents of said aqueous phase in ions of metals of groups III to VIII of the periodic table being however below the proportions which catalytically favor the oxidation of $U^{+3}$ into $U^{+4}$, and contacting said aqueous phase with an organic phase containing uranium in the valence state IV under conditions which exclude substantial transfer of uranium in either valence state from one phase into the other, while maintaining said aqueous phase out of contact with electrically conductive parts.

Particularly, the contents of the aqueous phase in any of the metals selected from the group consisting of nickel, copper or cobalt should be maintained below 1 ppm with respect to its content of $U^{+3}$ ions.

According to another aspect of the invention, there is provided a process comprising digesting two compounds of uranium of valence state III which are not reactive with respect to each other, in a liquid phase and separting the two compounds.

It is not necessary to shield the phases and especially the aqueous phase from the atmospheric air, but in most cases, the method will be carried out in a closed installation, especially to avoid loss of solvents by evaporation.

In a particular embodiment, the process according to the invention is operated as a multistage process which comprises repeating several times, particularly a number of times sufficient to produce a substantial enrichment of the uranium in the 235 U isotope, and in a corresponding number of successive isotopic exchange sections; a cycle which comprises:

counter-current extraction by an aqueous phase previously depleted of its uranium contents, in a zone upstream of a given isotopic exchange section with respect to the direction of flow of said aqueous phase, of the U IV contained in an organic phase, which U IV already underwent an isotopic exchange in the said given section;

reduction of U IV, extracted as $U^{+4}$ in the aqueous phase, and production within said given section of an isotopic exchange between the aqueous phase containing $U^{+3}$ and the organic phase previously loaded with U IV, said isotopic exchange being effected under conditions which exclude substantial transfer of uranium in either valence state from one phase to the other, and oxidation of U III into U IV within the aqueous phase, subsequent to the isotopic exchange, downstream of said section, and transfer of the oxidized uranium into the organic phase previously freed of its U IV contents.

Advantageously, substantial transfer of uranium IV into the aqueous phase from the other phase during the isotopic exchange operation is prevented by means of a salting-out agent (or relargant) of U IV previously introduced into the aqueous phase.

The uranium of valence IV may be extracted directly from the organic phase by the previously adjusted aqueous phase in order that the transfer may be practically complete; this adjustment can be example be constituted by a reduction in the content of salting-out agent. The extraction of $U^{+3}$ from the aqueous phase may be done, after oxidation to $U^{+4}$, by the organic phase selected so that the transfer is also practically complete for a suitable content of the aqueous phase of salting-out agent.

The aqueous phase which contains $U^{+3}$ in solution must obviously in this case:

be able to contain $U^{+4}$;

enable the extraction of uranium of valence IV by the organic phase and for this purpose be able to receive a salting-out compound which will generally be a halogen ion donor, the uranium then being present in the aqueous phase in the form of halogenide, whereby the oxidation and reduction operations are greatly facilitated, the hydrogen or hydracid obtained on reduction being used to effect the reoxidation. Particularly, the $Cl^-$ ion can be used as salting-out agent and $UCl_3$ can be used as the uranium salt in the aqueous phase. Other non-reducing salting-out agents may however be used.

Obviously, the uranium contents of the aqueous and organic phases should be as high as possible; however, the following conditions should also be fulfilled and limit the contents: precipitation should not occur anywhere in the apparatus; the viscosity of the phases should be low enough not to impede the flow; the difference between the specific weights should be sufficient for separation to be easy.

In practice, for a complete reflux cascade, the flows of the organic phase and of the aqueous phase will be selected as a function of the uranium concentrations of the two phases, such that the flows of uranium into these two phases, be of the same order. The exchange conditions and particularly the content of salting-out agent of the aqueous phase will be selected so that less than 5% of uranium of valence IV passes from the organic phase to the aqueous phase. Practically passage of uranium of valence III from the aqueous phase to the organic phase does not occur in almost all cases, since there exist very few complexants of uranium of valence III.

The aqueous phase can only contain $UCl_4$ in solution if it has a minimum acidity (which depends on the concentration of $U^{+4}$ ions), failing which uranium precipitates in the state of the hydroxide. In practice however, it will often be possible to re-extract $UCl_4$ from the organic phase with water which is acidified by absorption of the acid contained in the organic phase.

As has been indicated above, the aqueous phase must contain a salting-out agent during contact with the organic phase. If it is assumed for simplification that this salting-out agent is constituted by $Cl^-$, the $U^{+3}$ containing phase must then contain a considerable concentration of hydrochloric acid or of a chloride. However, in the latter case, every chloride cannot be used. There must be avoided any cation:

which forms part of a Redox system whose standard potential is greater than that of the $U^{+3}/U^{+4}$ system, if it reacts with noticeable speed, this condition having to be respected in homogeneous phase, which has the above characteristics, if the second participant of the system is a metal. This metal will then be reduced by uranium and generally attacked again by the acid. A process of catalytic character will take place which will lead to rapid oxidation of $U^{+3}$, even if the ion responsible for the process is present in very slight amount. This is particularly the case of nickel, copper or cobalt ions, the content of which must be kept less than 1 ppm (part per million) with respect to the uranium.

The phase containing $U^{+3}$ must not only be practically free of certain ions, but any aqueous solution containing $U^{+3}$ must be kept out of contact with electrically conducting walls. As a matter of fact when, for example, an acid solution containing $U^{+3}$ is in contact with a conductive material, the latter can facilitate the reaction between $U^{+3}$ and $H^+$ (which is normally very slow in pure homogeneous phase) by participating in the exchange of electrons between the two participants in the reaction. This process of catalytic character is more or less rapid according to the relative disposition of the intensity-potential curves of the reaction $U^{+3} \rightarrow U^{+4}$ and $H+ \rightarrow H_2$ on the material concerned. In particular, this process will be all the more considerable as the hydrogen over-potential with respect to this material is less.

Summarizing, contact of the aqueous solution with conductive materials must be avoided, except in very particular cases (cathode for electrochemical reduction kept under voltage) as well as the presence in the aqueous phase of ions which could catalyse its decomposition, in particular those having an oxidation-reduction potential comparable with that of nickel, copper and cobalt, even at very low contents. The only tolerable cations are those which cannot be reduced by $U^{+3}$ such as ions of alkali metals or alkaline earth metals. The chloride containing salting out agents which are suitable in addition to HCl, are alkali chlorides or alkaline earth chlorides which are sufficiently soluble (such as $LiCl$ or $MgCl_2$).

The bringing of the valencies III and IV in contact can be effected by extremely various methods. The phases containing the uranium under the two valences can be mixable, partially miscible, or non-miscible. One of the phase (or the phase in the case of homogeneous phase) will be liquid. The other phase can be liquid or solid, especially ion exchange resins in the latter case.

The liquid phase, or each of the liquid phases, can be aqueous, organic or mixed, containing uranium in the form of ions or in the state of a complex (this case being often that of an organic phase). Solvents which are capable of solubilizing uranium IV are well known.

By aqueous phase, will be understood an aqueous solution of a mineral or organic salt of uranium in the dissociated state. The aqueous phase containing $U^{+3}$ will generally be a solution of a hydracid whose halogen ion will play the role of a salting out agent. In any case, only non-oxidizing acids will be used. In practice, hydrochloric acid solution will generally be used, HCl being the least expensive of the strong acids, although use of other hydracids and, to a lesser extent, of non-oxidizing strong acids can be contemplated.

By organic phase, will be understood a solution in an organic solvent (or a mixture of such solvents) of a salt or complex of uranium, of valency III or IV, as the case may be may be, in addition a diluent as, for example when it is desired to modify the viscosity, the density and/or surface tension of the organic phase and to act on various parameters, such as decantation times. Many liquid organic solvents may be used, and the technician skilled in the art will have no difficulty in selecting a suitable solvent. Recourse will generally be had to the well known solvents which are used in the treatment of irradiated nuclear fuels. These organic solvents will, as a general rule, be selected from the list below, depending on the selected uranium salt; it will often be necessary to add thereto a diluent which may be selected among aliphatic or aromatic hydrocarbons and their derivatives (such as benzene, toluene, dodecane, kerosene, xylene...) which are liquid at ambient temperature. The solvents may be for example organic compounds belonging to the families below, which do not contain oxidizing impurities, and which are selected with regard to their high exchange capacity, their good resistance to hydrolysis and to their ability to allow for an easy decantation:
alcohols anionic exchangers, such as tricaprylmethylammonium chloride (sold under the trade mark "Aliquat 336" by General Mills, Kankakee, Illinois)

neutral organophosphorous compounds, bearing the function P=O which gives with uranium salts complexes generally including several ligands for one molecule of uranium. Several families of these may be distinguished:

phosphates of the type $(RO)_3P(O)$ or $RO R'OR''OP(O)$ (the R, R' and R'' radicals being linear or branched aliphatic or aromatic carbon chains of which two do not contain more than 8 and of which the third can extend up to 12 carbon atoms (the number being however preferably 6 at the most for each), for example: tributylphosphate (TBP), triisobutylphosphate (TiBP), tripropylphosphate (TPP), triethyl-12-butylphosphate (TEBP), tri-2-methylbutylphosphate (T2MBP), tri-2-ethylbutylphosphate (TBEP);

the phosphine oxides $RR'R''P(O)$ in which the radicals are of the same family as previously; among the phosphine oxides, there may be indicated a particular family in which one of the chains bears the ether oxide function and of which the general formula is $RO(CH_2)n-P(O)R'R''$; R, R' and R'' are radicals as above and n is an integer at least equal to 1: trioctylphosphine oxide (TOPO), tributylphosphine oxide (TBPO), di-N-propylmethoxyoctylphosphine oxide, di-N-butylethyl-2-methoxyisobutylphosphine oxide, di-isobutylmethoxymethyloctylphosphine oxide, triamylphosphine oxide (having however the drawback of being soluble in water), trihexylphosphine oxide;

the phosphonates of formula $ROR'OR''P(O)$ which constitute intermediate compounds, R, R' and R'' having the above indicated meanings, such as: dibutylbutylphosphonate (DBBP), di-isobutylphosphonate, di-octyloctylphosphonate, di-isobutylbutylphosphonate, dibutylisobutylphosphonate, di-isoamylamylphosphonate, di-isopropylbutylphosphonate, di-isobutylhexylphosphonate, di-isobutylisoamylphosphonate, di-isobutyloctylphosphonate, di-isobutylethylhexylphosphonate and di-isobutylmethoxylaurylphosphonate; these phosphonates may be diluted for example by dodecane and/or xylene;

the phosphinates of formula $ROR'R''P(O)$ which are also intermediate compounds between the phosphates and the oxides of phosphine, R, R' and R'' having always the same meaning; among the phosphinates may be mentioned: di-isobutylphosphinate (used diluted in toluene), di-hexylhexylphosphinate (used diluted in kerosene R), dibutylisobutylphosphinate (used diluted in toluene), di-isobutylbutylphosphonate (used diluted in toluene), dihexylisobutylphosphinate (used diluted in kerosene R), dioctylisobutylphosphinate (used diluted in kerosene R).

At the present time, the phosphates and phosphonates seem to be the solvents which give the best results if one takes into account the various factors which come into play (speed of extraction, facility of separation, etc.).

When working by liquid-liquid exchange between two phases, they must obviously be selected as a function of one another.

By solid organic phase, is meant any organic ion exchanger having fixed ionic compounds of uranium, such as ion exchange resins. Strong cation exchange resins are known (for example sulfonic polystyrene resins), weakly cationic complexing or chelating agents (for example resins bearing carboxylic, phosphate or aminodiacetic groups), strong anionic resins (for example quatenary ammonium), moderate or weak anionic resins (for example various amines). The above expression may also mean a mineral or organic compound deposited or adsorbed on a solid organic support (polystyrene, PTFE or Kel F for example) or a solid organic compound used alone.

Isotopic exchange by the method according to the invention can take place between two different compounds of uranium III or between compounds of uranium III and uranium IV: it is the latter solution which is by far the most interesting.

Isotopic exchange by the method according to the invention can take place either in a monophase liquid system, that is to say the uranium compounds are brought in contact in a homogeneous phase, or in a two-phase system, that is to say that the uranium compounds are in two different phases, like a liquid and a solid or two liquid phases which are not miscible. However when the isotopic exchange is effected in a monophase system, it is necessary to separate, after enrichment, either the depleted compound, or the enriched compound by creating a two-phase system, which complicates the method and renders the yield less advantageous.

Among the methods of applying the invention, exchange in liquid phase seems particularly advantageous, especially because it is possible to obtain and to maintain the necessary purity without excessive difficulty. Among these methods, those which seem most advantageous at the present time use exchange between an aqueous phase containing U III and an organic phase containing U IV. U III will generally be in the form of a salt dissociated in solution. The salt will for example be $UCl_3$ in an aqueous solution of HCl playing the role of a relargent or salting-out agent.

The concentration of uranium of the aqueous and organic phases of the solutions is adjusted as a function of the compounds of uranium used, of their crystallisation limits, of the temperature of the clogging limit of the contactor selected. It will be chosen as high as possible to reduce the volume of the installation, but it must, as indicated above;

limit the passages of uranium with the valence IV from the organic phase to the aqueous phase in the course of the contact, the passage of uranium of valence III into the organic phase being negligible with the usual solvents;

enable the almost complete re-extraction by means of simple adjustments (elimination of the salting-out agent for example).

In practice, there is generally used for the exchange:
an 0.1 – 2.5 M/1 aqueous solution of U III; with $UCl_3$ in a hydrochloric solution, upper limit is preferably limited to 2 M/1;
a concentration of 1.5 M/1 gives good results; an 0.1 – 1 M/1 organic phase of U IV. With $UCl_4$ at ambient temperature, by using the abovementioned complexants. The contents in the neighborhood of 1 M/1 require in general working at higher temperatures than ambient, thereby reducing the proportion of diluent.

An isotopic exchange device or installation for enriching uranium in one of its isotopes, according to another aspect of the invention, comprises:

an exchange battery constituted by a plurality of stages each comprising a contactor between two phases, one containing U III, the other U IV, and means for causing the circulation of one of the phases in counter current with the other in the battery, an oxidizing reflux circuit comprising means for performing substantially complete extraction of U III from the phase which contains it at the end of the battery whence this phase emerges, means for oxidizing U III to U IV and for transferring the oxidized uranium into the other phase for introduction at the same end of the battery, a reducing reflux circuit comprising means for substantially complete extraction of U IV from the phase which contains it at the other end of the battery, for substantially complete reduction of U IV to U III and for transfer of the reduced uranium into the other phase for introduction at said other end, the whole of the surfaces in contact with U III being electrically insulating.

The means for reducing U IV to U III are advantageously provided to trap the troublesome ions: thus, the necessary purity is maintained provided that the content in these ions of the uranium solutions to be enriched introduced in the system be less than ppm and that the reflux be almost complete, that is to say the cascade almost square.

The uranium can be brought to the cascade at the valence III or IV: but in most of cases, the initial loading of the cascade will involve making use of particular compounds of U III and U IV.

Numerous methods for the preparation of uranium compounds with valence IV are already well known; there may be mentioned the electrolytic reduction of uranyl salts, the chemical reduction of these salts with a suitable reducer not permitting $U^{+3}$ to be obtained (hydrogen or cracked ammonia without impurities), direct attack of a uranium oxide ($UO_2$ by carbon tetrachloride towards 600° C) or of metallic uranium by an acid, followed by filtration.

Uranium III may be obtained from uranium IV or from its compounds by methods which will be described below with regard to reducing refluxes. There may for example be used reduction of uranium IV by the electrolytic route, by the chemical route (for example by zinc or its amalgam); uranium metal may also be attacked with an acid under the specified conditions; or by dissolving $UCl_3$ (or other salts of U with valence III) obtained by a dry route.

It is lastly necessary to note that reduction with zinc of a solution of a uranyl salt with a suitable acidity (5 N hydrochloric acid for example) enables the obtaining of an equimolecular mixture of uranium III and IV which must then be protected against oxidation. In this case, isotopic exchange, in a monophase system, is produced at the same time as the formation of the two compounds.

Lastly, various examples of apparatus usable in the installations will be described with regard to the various embodiment envisaged below. It is however important to note that the speeds of isotopic exchange are very high and that, in consequence, the times of contact must be chosen as short as possible, to reduce the volume of the solutions, especially in the stages or the cascades where the uranium is very enriched. As a result, the use of contact apparatuses involving short transit times is advantageous in the case of liquid-liquid exchange. It may be noted by way of indication that usual mixer-decanters hardly enable dropping below 40 sec. and pulsed columns rarely below 30 sec., which leads to the preference of other equipment such as centrifugal mixer decanter assemblies, unfortunately more expensive.

SHORT DESCRIPTION OF THE DRAWINGS

Various embodiments of the invention will now be given by way of non-limitative examples. The description refers to the drawings which accompany it, in which:

FIG. 3 shows a diagram of an irreversible liquid-liquid isotopic exchange installation between compounds uranium III and uranium IV;

FIG. 4 is a diagram of a reversible liquid-liquid isotopic exchange installation between uranium III and uranium IV compounds in different phases;

FIGS. 5 to 9 are partial diagrams of installations constituting modifications of that of FIG. 4;

DESCRIPTION OF PREFERRED EMBODIMENTS

For greater clarity, the flow sheet of a conventional isotopic enrichment cascade and the general features of such a cascade modified according to the invention will first be described with reference to FIG. 1.

It will now be assumed that this cascade is intended for isotopic enrichment of natural uranium in isotope 235 by a method according to the invention of exchange between an aqueous phase containing U III and an organic phase containing U IV.

The exchange battery 11 of the cascade comprises $p$ identical stages which will be denoted as $1, \ldots, n, \ldots, p$. At stage $n$ for example, the aqueous phase 1 containing $U^{+3}$ coming from stage $n + 1$ is mixed with the organic phase containing $U^{+4}$ coming from stage $n - 1$; after separation, the aqueous and organic phases emerge respectively at 3 and 4. The phase containing U IV is enriched in light isotope U 235. If $\beta$ is the enrichment coefficient per stage and if $R_n$ is the ratio of the richnesses U 235/U 238 (assumed equal at the inputs 1 and 2), the organic phase at the output has the richness $R_n$.' of U 235.

Figure 1:
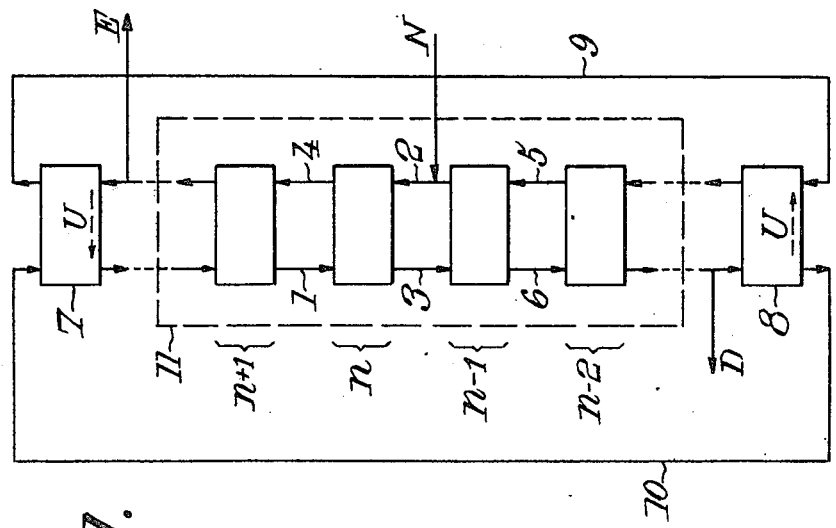
FIG. 1 shows, for the purpose of explanation, the general diagram of an isotopic enrichment cascade, using a method which can be that according to the invention.

FIG. 1 also shows diagrammatically, the "rich" reflux 7, where U IV enriched in U 235 is reduced to the state of U III and reintroduced at stage $p$ in aqueous phase, and the "depleted" reflux which fulfills the reverse functions of oxidation, of transferring the uranium from the aqueous phase to the organic phase and of reintroduction into stage 1.

Conventional computation of an enrichment cascade shows that it is advantageous to adjust at each stage the ascending (from 1 to $p$) and descending flowrates so as to avoid isotopic remixtures, that is to say to bring the uranium arriving at 2 to the same isotopic richness as the uranium arriving at 1: this condition is not feasible economically; it is therefore convenient to approach as far as possible this ideal condition by carrying out partial refluxes between a limited number of so-called "square" sub-cascades, such as those of FIG. 1, with a very low flow-rate input at N and a very low corresponding flow-rate outputs of enriched uranium at E and depleted uranium at D.

Figure 2:
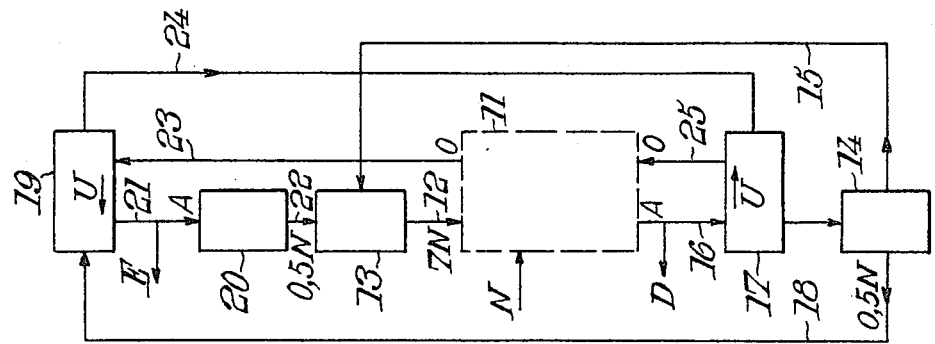
FIG. 2 shows a diagram of an installation for isotopic exchange between compounds of uranium III in two different liquid phases (aqueous and organic)

FIG. 2 shows a cascade which comprises an exchange battery, where instead of exchange between U III and U IV, there is used exchange between an inorganic liquid phase of uranium III and an organic phase of U III. The use of those organic solvents mentioned above which cannot complex U III is obviously excluded in this case. The exchange battery 11 can have a constitution similar to that described in FIG. 1, but the refluxes are of different nature.

The phases are for example the following:

ORGANIC PHASE:

Uranium in the form of a complex in a dilute organic solvent, capable of placing the uranium III in the form of a complex such as phosphonate. At ambient temperature, an aliphatic or aromatic inert diluent, like for example dodecane, kerosene or xylene, is added to the solvent. There can for example be used an organic phase 0 constituted by:

$$O \begin{cases} \text{Phosphonate} = 50\% \text{ (for example dibutylbutylphosphonate DBBP)} \\ \text{Xylene} = 50\% \\ \text{U III} = 0.005 \text{ M} \end{cases}$$

INORGANIC PHASE:

Uranium at low concentration in the aqueous phase. To this phase there must imperatively be added a strong salting out agent intended to maintain the uranium complex in the organic phase. If the uranium is in the form of $UCl_3$, the salting out agent may be $Cl^-$ at strong concentration in the form of HCl and/or alkali or alkaline-earth chloride. There can for example be used as the aqueous phase A:

$$A \begin{cases} U^{+3} : & 0.2 \text{ M in the form of } UCl_3 \\ HCl : & 5 \text{ to } 8 \text{ N, advantageously } 7 \text{ N.} \end{cases}$$

The aqueous phase enters the exchange battery 11 through 12. In the compartment 13, the acidity of this aqueous phase has been raised from 0.5 to 7 N due to the hydrochloric acid coming from the separator 14 through 15.

After isotopic exchange, this aqueous phase goes from the exchange battery 11 to an extractor 17 through a pipe 16. In this extractor, the aqueous phase A is brought in contact with a 50% exhausted DBBP in xylene. The uranium III then passes entirely from the aqueous phase into the organic phase. The aqueous phase exhausted or uranium then goes into the separator 14. This separator 14 extracts the hydrochloric acid at 15 and restores an aqueous phase whose normality of HCl has passed from 7 N to 0.5 N. The hydrochloric acid is sent into 13 through 15 whilst the aqueous phase 0.5 N, exhausted of uranium, is sent through 18 to a reextractor 19 where it is brought in contact with the organic phase 0 coming from the exchange battery 11. The whole of the uranium III passes from the organic phase into the aqueous phase, the latter containing practically no more salting out agent. The charged aqueous phase A then enters through 21 in an apparatus 20, where the uranium, of which a portion has possibly been oxidized, is brought back entirely to valence III. Finally, the aqueous phase is brought through 22 into the compartment 13 in which HCl, playing the role of salting out agent, is introduced.

The organic phase 0, after isotopic exchange in the exchange battery 11, is sent through 23 to the extractor 19 where the uranium is extracted by the aqueous phase. The exhausted organic phase emerging from 19 through 24 goes to the extractor 17 where the uranium contained in the aqueous phase passes into the exhausted organic phase, owing to the presence of salting out agent in the aqueous phase. Finally, the organic phase loaded with uranium enters 11 through 25. The supply of natural uranium is effected at very low flow-rate through N, the withdrawl of depleted uranium at D and the taking off of enriched uranium at E.

The components of the battery can have the constitution which will be described below with regard to FIGS. 3 and 4.

There will now be described in more detailed manner exchange batteries between U III and U IV according to the diagram of FIG. 1.

The liquid-liquid isotopic exchange between the compounds of U III and compounds of U IV in the liquid phase, may be effected under various conditions, two of which will be described in the following, i.e.:

the exchange in homogeneous aqueous phase with extraction of U IV by an organic phase;

exchange between an aqueous phase containing U III and an organic phase containing U IV, this condition giving rise to a lower consumption of energy and to a simpler apparatus than the first and being generally preferable.

These two embodiments will be described successively by making reference to the examples. In all cases, the phase containing the U IV is enriched in light isotope ( U 235 in the case of enrichment of natural uranium).

FIG. 3 shows diagrammatically three intermediate stages ( or rank $n - 1$, $n$ and $n + 1$) of a cascade employing exchange in homogeneous aqueous phase, as well as two end stages 1 and $p$ and the refluxes. The number $p$ of stages is chosen as equal to the number of theoretical plates to obtain the desired enrichment. The poor reflux (that is to say depleted in U 235) and rich reflux are constituted by apparatuses enabling the uranium contained respectively in the phases containing U III and U IV and emerging through one end of the cascade to pass at the other valence before reintroduction at the same end of the battery in the other phase.

The stages are all identical. The stage $n$ for example comprises an apparatus 29 in which the aqueous phases are mixed prior to exchange, then subjected to extraction by the organic phase.

The apparatus 29 is for example a pulsed column, a mixer-decanter (which has the drawback of not permitting allowing for a contact time of less than about 40 seconds in the present state of the art), or a static mixer-centrifugal separator assembly. These apparatuses should not have any surface which is electrically conducting in contact with the phases undergoing exchange and must not introduce catalytic ions. For this purpose, recourse should be had to either apparatuses made of plastic materials, or apparatuses with surfaces coated with an insulating material.

The apparatus 29 of the stage $n$ receives, through 45, the aqueous phase charged with U III coming from the subsequent stage $n + 1$ and, through 41, the aqueous phase charged with U IV from the preceding stage $n - 1$. The aqueous phase charged with U III and depleted in U 235 emerges from the stage at 37 to go to stage $n - 1$, after treatment.

In the apparatus 29, U IV is extracted entirely by an organic phase circulating in counter-current, entering at 34 and emerging at 30.

One may for example use:

as input phase charged with U III, an aqueous hydracid solution (generally hydrochloric) about 5 N, whose content of U III ranges from 0.1 to 2 M/1;

as input phase charged with U IV, an aqueous solution of the same hydracid (generally hydrochloric) about 5 N, of which the content of U IV ranges from 0.1 to 2 M/1;

as organic phase for the extraction of U IV, capable of extracting the U IV entirely from the aqueous phase having the contents of hydracid (constituted by HCl) indicated above, various solvents, such as:

trioctylphosphine oxide (TOPO), diluted in an aromatic organic diluent like xylene in the proportion of 10% of trioctylphosphine oxide by weight, if one works at ambient temperature, triheptylphosphine oxide or THpPo, trihexylphosphine oxide or THxPO, these solvents being also diluted.

With the apparatus 29 are associated:

an assembly for adjusting the acidity of the aqueous solution of U III, before its being sent to the preceding stage, an assembly for re-extraction of U IV from the organic phase by an aqueous phase and adjustment of the latter before being sent to stage $n + 1$.

The first assembly comprises a hydrochloric acid concentrator 33, which may use electrolysis, osmosis or evaporation (with the addition of a salt to avoid the azeotrope $H_2O$ - HCl with 20% of HCl at atmospheric pressure). The latter solution will generally be the most advantageous. The concentrator may be one of the well known types for the preparation of concentrated HCl, such as those described in U.S. Pat. No. 2,357,095 (Evans et al) and G. B. U.S. Pat. No. 669,671 (Wingfoot Corp.) or in the article of M. J. Dehan "Carbon and hydrochloric acid" (Chimie et Industrie, Vol. 105, No. 23, November 1972, pages 1683–1687), but provided to avoid the addition of oxidizing ions and the contact with any conducting surface (which implies glass members).

From the concentrator 33 supplied with hydrochloric aqueous solution 4–9 N arriving through 37 emerge:

at 32, an aqueous solution freed of uranium, very slightly acid (less than 0.5 N) to be able to extract U IV from an organic phase; the extraction can even be effected with water, the TOPO having retained sufficient acid to avoid the precipitation of U IV;

at 38, concentrated acid, generally in the gaseous form, at 42, an aqueous solution, containing the whole of U III (depleted in U 235) which goes to stage $n - 1$.

The second assembly comprises a re-extractor 31 (which can be very similar to the apparatus 29) in which U IV is entirely extracted by the very slightly acid aqueous phase coming through 32 from the concentrator 33. The aqueous solution charged with U IV goes through 35 to the stage $n + 1$ where it will be reacidified before introduction into the exchange apparatus of the stage.

At each stage ($n$ for example), the aqueous solution coming through 40 from the re-extractor of the preceding stage ($n - 1$ for example) is acidified before introduction into the apparatus 29: this operation is effected in a mixing acidifier 39 supplied with hydrochloric acid by the concentrator 33, by means of 38.

The U IV uranium enriched in U 235 emerging in concentrated aqueous phase, very slightly acid, from the re-extractor of stage $p$ is reduced to the U III state and reintroduced at stage $p$ through a reducing reflux. This reducing reflux comprises an apparatus 46, supplied through 47 from the re-extraction of stage $p$, which restores U IV to the stage U III. It can be very similar to that which will be described below with reference to FIG. 4 and it suffices here to note that this apparatus 46 may be:

a reactor in which U IV is reduced to U III in the aqueous phase by a reducing solid product such as metallic zinc or a zinc amalgam, recovery of the zinc having then to be provided for.

An electrolysis tank with a diaphragm in which the uranium is reduced by the electrochemical route. The tank can be of the type used for the manufacture of chlorine, but with non-metallic walls or covered with insulation (except for the electrodes) and a porous diaphragm of sintered glass, PVC, PTFE, or an ion exchange membrane insulating the cathode compartment.

The cathode can for example be of a metal or alloy whose hydrogen overpotential is sufficient, such as mercury or an amalgam, of lead for example. The anode may be of graphite. Lead, cadmium, tin can also be contemplated.

The solution in the cathode compartment is brought to between 1 and 2 N by addition of HCl from the concentrator 52 of the stage 1 to improve the Faraday yield. The chlorine which is released at the anode is fractionated: a part is recombined with hydrogen formed at the cathode; the rest is used in the oxidizing reflux, as will be seen below. In practice, 0.25 A/cm$^2$ is not exceeded in the course of the electrolysis.

The aqueous solution of U III taken up through 48 in the apparatus 46 supplies the last stage p of the cascade, after having been acidified by a delivery of HCl coming through 51 from the concentrator 52 of stage 1.

The reducing reflux, when a mercury cathode is used, also effects the elimination of troublesome cations (such as Ni, Cu,...) and enables the maintenance of their content at a very low value (less than one ppm) which is necessary: these cations are amalgamated and then retained by an auxiliary mercury purification system.

The oxidizing reflux is provided on the other hand to oxidize the uranium emerging through 53 from the concentrator 52 from the first stage in slightly acid concentrated aqueous phase from the U III form to the U IV form, and to reintroduce it through 54 in to the apparatus $29_1$ of this first stage.

The reflux comprises a reactor 50 in which U III is restored to U IV, for example by one of the following operations:

electrolysis;

bubbling of an oxidizing gaz (Cl$^2$ for example, coming through 49 from the tank 46 as indicated in FIG. 3).

The operational conditions must be obviously selected to avoid bringing the uranium to valency VI.

Figures 4, 5:
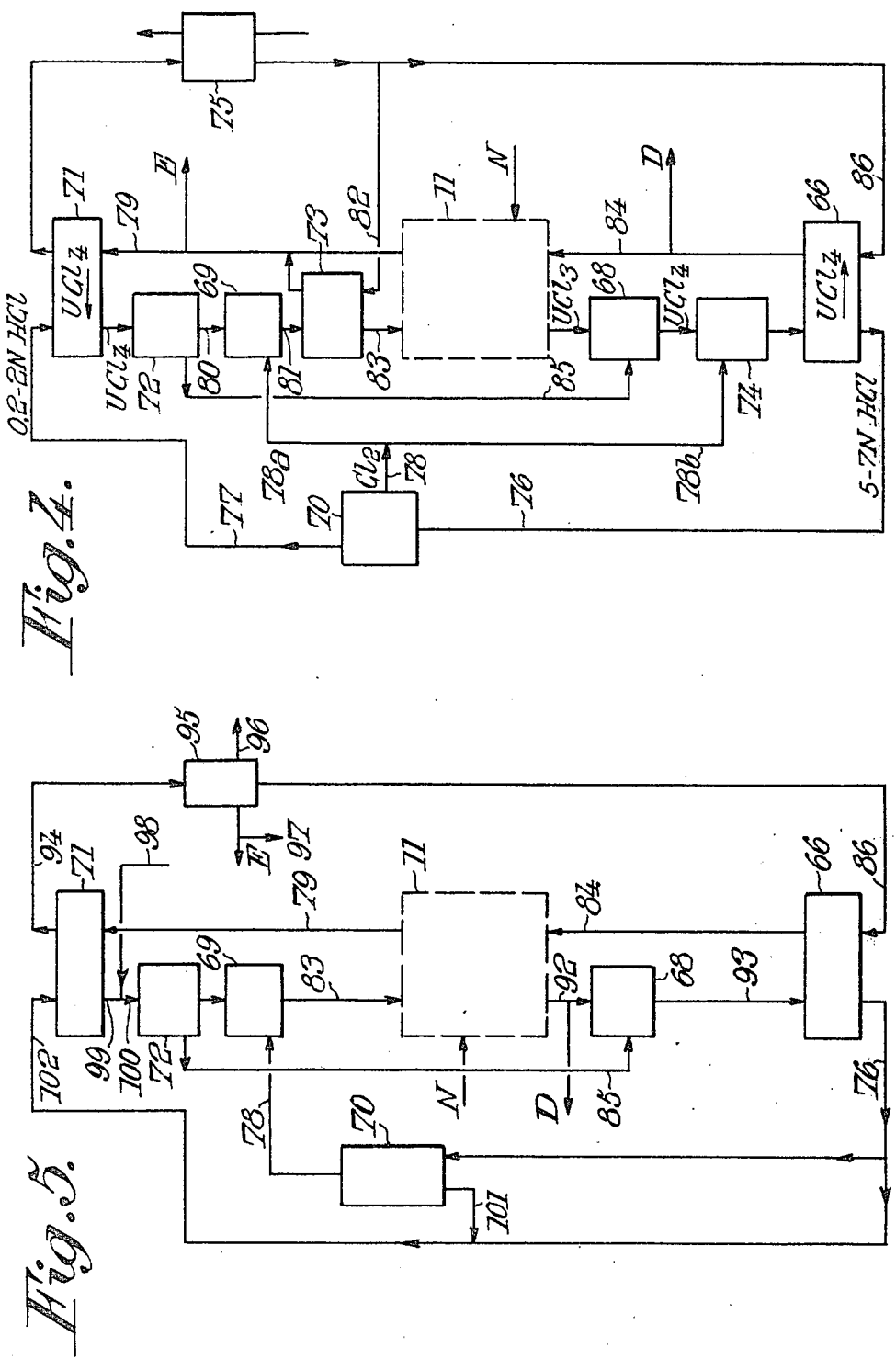

In the case of the refluxes indicated in FIG. 4, there is a double interaction between the refluxes:

the chlorine serving for the oxidizing reflux comes through 49 from the anode compartment of the electrolyser 46 used for the reducing reflux;

the acid coming from the deacidifier 52 at stage 1 (corresponding to the oxidizing reflux) is used before and after the electrolysis at 46 to enable good electrolysis and adjust the acidity of the emerging solution.

The table below brings together the results of a certain number of trials in flasks for which the uranium salts were 0.2 M UCl$_4$ and UCl$_3$ chlorides in an HCl medium of 4 to 9 N.

| N° | 1 | 2 | 3 | 4 | 5 | 6 | 7 | 8 | 9 |
|---|---|---|---|---|---|---|---|---|---|
| N HCl Medium | 7 | 7 | 7 | 7 | 5 | 4 | 5 | 5 | 5 |
| Extraction agent | TOPO | TOPO | TOPO | TOPO | TOPO | TOPO | TOPO | TOPO | TOPO |
| Duration | 3 m | 5 m | 5 m | 10 s | 30 s | 30 s | 1 m | 3 m | 7 m |
| $\alpha - 1 \times 10^4$ | 38 | 40 | 40 | 38 | 39 | 38 | 37 | 36 | 35 |
| Diluent | Tol | Tol | Tol | Tol | Tol | Tol | Tol | Tol | Tol |
| Temperature | Amb | −20° −25° | −20° −25° | Amb | Amb | Amb | Amb | Amb | Amb |

| N° | 10 | 11 | 12 | 13 | 14 | 15 | 16 | 17 | 18 |
|---|---|---|---|---|---|---|---|---|---|
| N HCl Medium | 5 | 7 | 7 | 9 | 5 | 6 | 5 | 5 | 5 |
| Extraction Agent | TOPO | TOPO | EH | TBPO | EH | EH | 3H | TH$_P$PO | TH$_P$PO |
| Duration | 15 m | 2 m | 1 m | 4 m | 1 m | 1 m | 1 m | 1 m | 1 m |
| $\alpha - 1 \times 10^4$ | 32 | 37 | 39 | 35 | 35 | 40 | 41 | 36 | 37 |
| Diluent | Tol | Tol | Ker | Tol | Ker | Ker | Ker | Tol | Tol |
| Temperature | Amb | Amb | Amb | Amb | Amb | Amb | Amb | Amb | Amb | where:
EH = di2ethylhexylphosphoric acid or D2EHPA
Tol = Toluene
Ker = Kerosene
Amb = Ambient (temperature in ° C)

Particularly satisfactory results are obtained under the following conditions:

acidity of the aqueous medium in mixerdecanters around 5N HCl;

extraction agent: dilute trioctylphosphine (TOPO).

The enrichment coefficient $\alpha$ is all the higher as the extraction is rapid; it diminishes with the duration of contact to reach an ultimate value corresponding to the reversible exchange and which corresponds to values of $\alpha$ of the order of 1.0027.

After the example of exchange in the homogeneous aqueous phase illustrated in FIG. 3, there will now be described the exchange between the hydrochloric aqueous phase of UCl$_3$ and organic phase (for example UCl$_4$ in TBP diluted in dodecane) with reference to the examples illustrated in FIGS. 4 and 5.

In FIG. 4, the battery of isotopic exchange stages is again denoted by 11. Each stage is constituted by an apparatus for bringing two phases in contact and, subsequently, for separating them, similar to the apparatuses 29 of FIG. 3. For example, use can be made of:

pulsed columns for liquid-liquid extraction, such as those marketed under the name PSE by Stahl Apparate und Geratebau, Viernheim, Hessen, R.F.A.;

multiple mixer-decanters or mixer settlers (which have however the drawback of long duration of contact) such as those marketed under the name LTE by Lurgi Ges. fur Warmetechnik mbH, Frankfurt, West Germany;

continuous Podbielniak centrifugal contacters for liquid-liquid extraction, marketed by Baker-Perkins Inc. Saginaw, Michigan, U.S.A.;

Lurgi Westfalia drum extractors with countercurrent circulation, marketed by Westfalia Separator AG, Oelde, West Germany, which enable flow-rates going up to 7m$^3$/hour;

Alfa-Laval counter-current centrifugal extractors;

rotary disc contactors;

extraction centrifuges; such as those marketed by Liquid Dynamics, Chicago, U.S.A., under the trade mark "QUADRONIC."

All the above-mentioned apparatuses, such as are available in commerce, comprises numerous metallic parts in contact with the liquid: they must obviously be modified and the parts concerned must be constituted or coated with electrical insulation. This can be glass or plastics. However plastics must be selected to resist at the same time concentrated acids (the hydrochloric aqueous phase) and constituents of the organic phase (especially phosphates and aromatic hydrocarbons).

With the battery 11 are associated:

a rich or reducing reflux, comprising a re-extractor 71, an apparatus 72 for reducing $U^{4+}$ to $U^{3+}$, an acidifier 69, an apparatus 73 for the possible extraction of $UCl_4$ and the associated pipes and equipment.

a poor or oxidizing reflux, comprising an apparatus 68 for oxidation of $U^{3+}$ to $U^{4+}$, an apparatus 74 for increasing the acidity, an extractor 66 and the associated pipes and equipment;

lastly apparatuses 70 and 75 for purification and recycling of the aqueous and organic phases.

The apparatus 70 is intended to remove all or part of the hydrochloric acid from a 5 - 7 N aqueous hydrochloric phase free of uranium which it receives at 76; there emerges therefrom, at 77, a solution containing between 0.2 and 2 N HCl and, at 78, HCl gas containing little water. This apparatus is for example a still.

In the re-extraction apparatus 71, the solution coming from 77 re-extracts completely the uranous chloride $UCl_4$ contained in an organic phase arriving at 79.

$U^{4+}$ contained in the aqueous phase loaded with $UCl_4$ emerging from the re-extractor 71 is reduced in the electrolyser 72 containing a semi-permeable membrane and of which the cathode is constituted either of mercury, or of lead, or of lead amalgam, or of metals whose hydrogen overpotential is sufficient, for example Cd, Sn; there is formed hypo-uranous chloride $UCl_3$ in the cathode compartment.

The electrolyser 72 may be of one of the types currently used in the preparation of chlorine by electrolysis, such as described for example in "Chlorine - Its Manufacture, Properties and Uses" J. S. Scance, Robert E. Krieger Publishing Company, Chapters 5 and 6. There may also for example be used:

cells with horizontal cathode, with forced or gravity flow; in particular, one may use cells operative with co-currents of the aqueous phase and of a thin layer of mercury, the cathode compartment being surmounted by a diaphragm of sintered glass provided with evacuation ducts for the hydrogen, and the anode compartment provided with pipes for the exit of chlorine;

vertical cathode cells constituted by a film of mercury falling by gravity, provided with diaphragms not capable of introducing impurities, for example of PTFE, PVC, fluon, grafted PTFE (the diaphragms may be of purified ion exchange resins or sintered glass), such as described at Chapter 15 pages 575–596 of the work "Industrial Electrochemical Processes" of A. T. Kuhn, Observer Publ. Co;, 1971; the mercury also serves as a heat carrier and is cooled before being returned to the cells;

cells with rotary horizontal cathode.

The aqueous phase emerging from the cathode compartment through 80 is acidified at 69 by HCl gas arriving through 78a until an aqueous solution containing more than 2 N HCl is obtained which emerges at 81. If residual $UCl_4$ subsists, it is extracted in a contact apparatus 73 by a portion of the exhausted organic phase brought in through a by-pass 82.

The aqueous phase then enters at 83 the exchange battery 11 where it circulates in countercurrent with an organic phase entering at 84 and containing $UCl_4$. At 68, the uranium from the aqueous phase is oxidized by the chlorine arriving through 85 of the anode compartment of the electrolyser 72: $UCl_3$ is converted into $UCl_4$. The acidity of the aqueous phase is brought to 5 – 7 N at 74 by a portion of the HCl gas arriving from 70 through 78b. Then $UCl_4$ is extracted in the apparatus 66 (a battery of pulsed columns for example) by the organic phase arriving at 86, almost entirely, because of the high content of salting out HCl of the aqueous phase. The aqueous phase freed of its uranium then feeds the deacidifier 70 at 76.

The organic phase which is loaded with $UCl_4$ at 66 emerges at 84 and circulates in 11 in counter-current with the aqueous phase entering at 83: the organic phase is enriched in 235 U whilst the aqueous phase is depleted in 235 U. $UCl_4$ is re-extracted at 71.

The organic phase freed of its uranium is then washed at 75 by a current of sodium carbonate which retains the hydrolysis products of the solvents as well as the possible oxidizing metals which precipitate. The purified organic solution is then recycled through 86. A small fraction is drawn off through 82 to extract residual U IV from the aqueous phase.

The assembly thus described will constitute a total reflux battery; production is ensured by introducing at N a flow of organic phase loaded with $UCl_4$ very small with respect to the circulating flow; this flow is compensated by portions taken off at E on the enriched uranium and at D on the depleted uranium.

Other modifications of this system are possible, for example as regards deacidification. It is possible for example to replace HCl gas arriving at 78b by a concentrated aqueous solution of depleted $UCl_4$ and to regulate the extraction battery 66 such that only a predetermined fraction of $UCl_4$ be extracted; the solution 76 which then contains $UCl_4$ is concentrated at 70 to liberate slightly acid water at 77, HCl gas at 78 and a concentrated solution of $UCl_4$ at 78b. HCl may be replaced by $MgCl_2$ or LiCl, at least partly, to increase the content of salting out agent without increasing the acidity.

The embodiment illustrated at FIG. 5 differs from the preceding one only by the constitution of the refluxes. For greater simplicity, the apparatuses corresponding to those of FIG. 4 bear the same reference numerals.

In FIG. 5, the counter-current exchange battery 11 receives through 90 the 8 N hydrochloric aqueous solution of $UCl_3$ to be enriched. This solution is mixed with an aqueous phase of $UCl_3$ coming from a reducing reflux constituted by an extractor 71, an electrolyser with a mercury cathode 72, an acidifier 69, and entering the battery 11 through the supply pipe 83. In the battery 11, this aqueous phase encounters, in countercurrent, an organic phase entering through 84, constituted by TBP diluted to 30% in dodecane and loaded with $UCl_4$, which emerges from the battery through 79. The 8 N hydrochloric aqueous phase, emerging from the battery 11, is divided into two fractions. The first fraction, of slight flow-rate is rejected at D. The other is sent through 92 to the oxidizing reflux. It is oxidized in a bubbler 68, by a current of chlorine entering through 85, and $UCl_3$ thus passes to the state of $UCl_4$. The aqueous phase charged with $UCl_4$ leaves the bubbler through the pipe 93 and enters an extractor 66. In this extractor 66, $UCl_4$ passes from the 8 N hydrochloric medium into the organic phase entering 66 through the pipe 86.

The organic phase, charged with $UCl_4$, leaves the extractor 66 through 84 and supplies the exchange battery 11. The 8 N hydrochloric aqueous phase exhausted of $UCl_4$ leaves the extractor 66 through 76. A portion of this hydrochloric solution is directed to a distillation apparatus 70 and the remainder (to which there is added through 71 water coming from the still 70, in order to bring its normality to about 3 N) enters through 102 re-extractor 71, wherein the 3 N hydrochloric phase encounters in counter-current the organic phase loaded with $UCl_4$ coming, through the pipe 79, from the exchange battery 11. The acidity conditions are such that almost the whole of the $UCl_4$ passes into the 3 N hydrochloric aqueous phase. The organic phase, freed of $UCl_4$, leaves the re-extractor 71 through the pipe 94 and is introduced into a separator 95, where the degradation products of the TBP are removed through 96. This separator may be a chamber for washing by $Na_2Co_3$.

The degradation products of the TBP comprise vigorous complexants and can entrain a portion of the enriched $UCl_4$. The fraction of these products which retain $UCl_4$ corresponding to the production is removed through E. The other fraction is treated to recover the uranium which is reintroduced into the aqueous phase in the installation through 98.

The 3 N hydrochloric aqueous phase containing $UCl_4$ emerges from the re-extractor 71 through the pipe 99. After mixing with $UCl_4$ recovered from 95, it is lead through the pipe 100 to the electrolyser 72 in which uranium IV is brought back to valence III.

The distillation apparatus 70 separates the 8 N hydrochloric solution emerging from the extractor 66, on the one hand into concentrated hydrchloric acid 78 which serves to restore to about 8 N the normality of the $UCl_3$ solution emerging from the electrolyser 72, before its entry into the exchange battery 11 and, on the other hand, into water 101 used to reduce the normality of the 8 N hydrochloric solution arriving through 76 before its entry into the re-extractor 71.

In FIGS. 6 to 9 are described various examples in which are to be found the same functions of enrichment and of oxidizing reflux on the depleted side (which is not shown), but where the reduction on the rich reflux side is ensured by an amalgam, according to various alternatives: the same reference numerals will again be used to denote the corresponding members.

Figure 6:
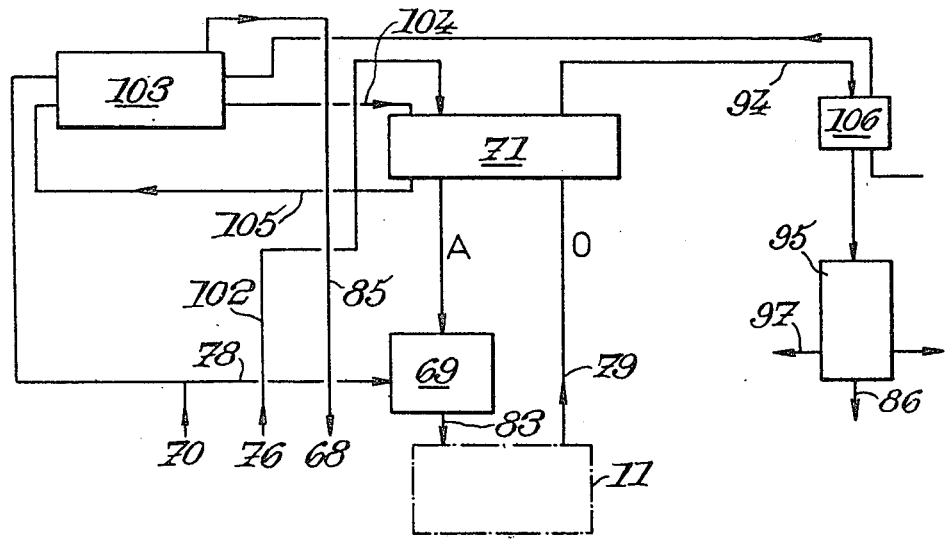

FIG. 6 shows the same devices to be used in connection with the method as in FIG. 5. However $UCl_4$ is reduced by zinc amalgam. The plate column 71 receives, besides the organic and aqueous phases, as in FIG. 5, a third phase constituted by zinc amalgam coming from the electrolyser 103 through the pipe 104. This amalgam is recycled from the column 71 to the electrolyser 103 through the pipe 105. Since a small amount of zinc is being entrained by the organic phase, a supplementary washer 106 is provided in the return pipe 86 of the aqueous phase.

FIG. 7 shows again the same devices to be used in connection with the method as in FIG. 4, but the electrolyser is replaced by a contactor 107 in which the reduction of the uranium IV to uranium III is effected by zinc amalgam coming through 108 of the electrolyser 109.

In the case of FIG. 8, the reflux 71 and reducing 107 apparatuses are replaced by a single apparatus 110 in which the three phases circulate: organic, aqueous and zinc amalgam. The two aqueous and organic phases circulate in counter-current whilst the direction of flow of the zinc amalgam is immaterial. $UCl_4$ is re-extracted and reduced in a single operation.

For an aqueous phase highly concentrated in salting out agent (HCl or chloride), the apparatus 110 constitutes by itself the whole of the reducing reflux.

Figure 9:
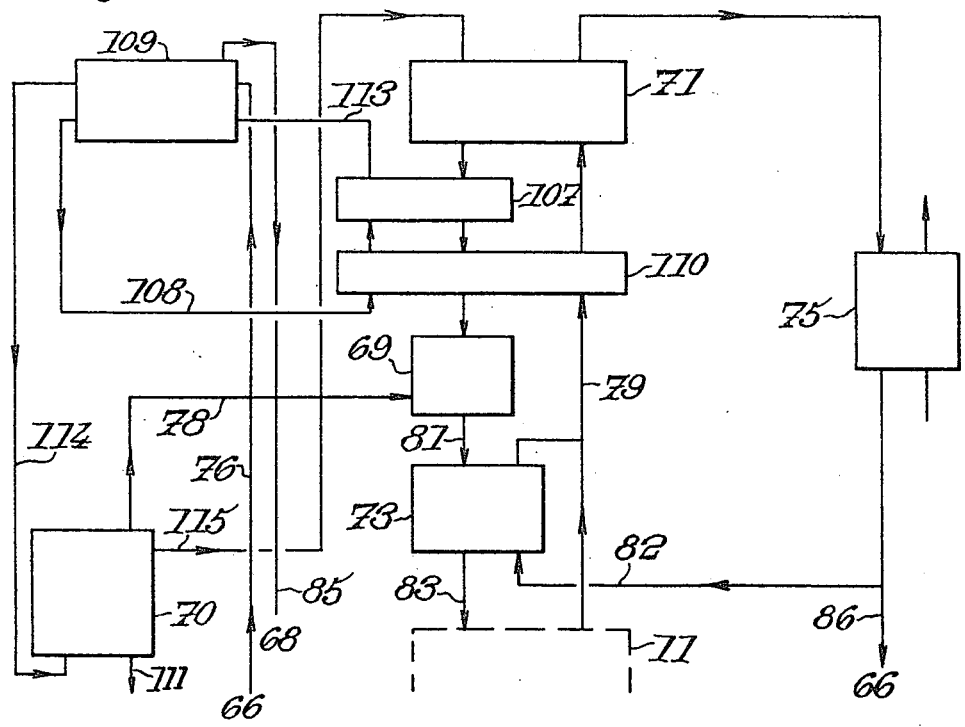

In FIG. 9, there is shown an alternative of the method which is convenient for aqueous phases with low contents of salting out agent (0.5 N). In this case, it is advantageous to combine the apparatuses 107–110 and 71 into a single tower, the flow of ZnHg arriving at mid-height of the tower.

The aqueous solution then contains zinc chlorde; it passes through the apparatuses 69 - 73 -67 - 68- 74- 66 without disturbing their operation.

In FIGS. 7 to 9, the addition at 74 of HCl gas may be advantageously replaced by the addition of a concentrated solution of salting out agent 111 (LiCl or $MgCl_2$ for example) emerging from the deacidifier 70. The flow-rate is adjusted so that the concentration of salting out agent in the solution 112 emerging from 74 is such that the uranium is extracted at 66 in a suitable number of stages.

The solution 76 exhausted of uranium is electrolysed at 109, the cathode being constituted by a film of amalgam 113 depleted of zinc coming from the reactors 107 and 110. The solution 114 which emerges from the electrolyser is not completely depleted of $ZnCl_2$ to maintain a suitable Faraday yield in the electrolyser.

In the deacidifier 70 which is, in these examples, a group of rectifying columns, there is removed at 115 steam containing little HCl, at 78 HCl containing little water, and at 111 a concentrated more or less acid solution of LiCl or $MgCl_2$ containing also $ZnCl_2$.

After condensation, the solution 115 serves to re-extract at 71, not only $UCl_4$ from the organic phase, but also the amount of $ZnCl_2$ which might also be contained therein. It will be noted that with this system it is advantageous to minimise attack by the hydrochloric acid on the zinc dissolved in the mercury, to replace a portion of the hydrochloric acid of 115 by a chloride not reduceable by the zinc amalgam and having a good salting out effect ($MgCl_2$ or LiCl alreadjy mentioned may be suitable).

This is obtained by by-pasing part of the flow 114 directly to 115. Some $ZnCl_2$ however remains in the organic phase emerging from 71; this $ZnCl_2$ must be removed or not by washing with acidified water according as the washing with carbonate 75 is run or not. In this case, the zinc electrolyser may, if necessary, be placed after the by-pass proposed hereabove.

$ZnCl_2$ can again be extracted by an organic phase which forms a complex of the $ZnCl_2$ (TBP for example), independent of the principal organic phase, at the level of 76, this $ZnCl_2$ being then re-extracted by 1 N hydrochloric acid in order to reduce the zinc in the amalgam with a good Faraday yield.

The following examples (of unit exchange for the examples 1 to 9) enable the magnitude of the separation factor to be appreciated.

EXAMPLE 1:

Uranium III - Uranium IV Exchange in a two-phase system

U III: in 0.4 M aqueous solution, 7 N hydrochloric medium
U IV: 0.4 M in benzene and TBP organic phase
Temperature: 21° C
Time of Exchange: 15 seconds
Separation factor: $\alpha = 1.0030$.

EXAMPLE 2:

Liquid-liquid exchange in a counter-current mixer-settler

Aqueous Phase: $\begin{bmatrix} U\ III = 0.2\ M \\ HCl = 7\ N \end{bmatrix}$

Organic Phase: $\begin{bmatrix} U\ IV = 0.2\ M \\ 50\%\ TBP\ in\ a\ dodecane\text{-}toluene\ mixture \\ 40\% - 10\% \end{bmatrix}$ Contact time variable from 49 to 132 seconds. Separation factor: $\alpha = 1.0012$ to $1.0026$ according to the contact time and agitation.

EXAMPLE 3:

Liquid-liquid Exchange using as organic solvent an alkyl phosphate $UCl_3 = 0.4$ M in 7 N aqueous hydrochloric solution
$UCl_4 = 0.4$ M complexed by TBP (40%) diluted in kerosene R/(60%)
Temperature: 21° C
Contact time: 15 seconds
Separation factor: $\alpha = 1.0025$.

EXAMPLE 4:

Liquid-liquid Exchange using an alkyl phosphate as organic solvent $UCl_3 = 2.35$ M + $UCl_4 = 0.13$ M in 1.55 N HCl solution
$UCl_4 = 0.42$ M in tri-isobutylphosphate (42% by volume)
diluted in xylene (58% by volume)
Temperature: 35° C
Contact time: 30 seconds
Separation factor: $\alpha = 1.0028$

EXAMPLE 5:

Liquid-liquid Exchange using a phosphonate as solvent $UCl_3 = 1$ M + 0.125 M $UCl_4$ in 4.6 N HCl solution
$UCl_4 = 0.55$ M in n-butyl di-isolbutylphosphonate at 40% in dodecane $$\text{Ratio volumes } \frac{\text{organic}}{\text{aqueous}} = 2$$

Temperature: 20° C
Contact time: 1 minute
Separation factor: $\alpha = 1.0025$.

EXAMPLE 6:

Liquid-liquid Exchange using a phosphine oxide as solvent $UCl_3 = 0.11$ M + $UCl_4 = 0.01$ in 5 N HCl
$UCl_4 = 0.12$ M in trioctylphosphine oxide (TOPO) diluted
to a content of 10% in toluene
Temperature: 25° C
Contact time: 1 minute
Separation factor: $\alpha = 1.0024$

EXAMPLE 7:

Liquid-liquid Exchange using a sulfoxide as solvent $UCl_3 = 0.42$ M+$UCl_4 = 0.16$ M in 4.5 N HCl
$UCl_4 = 0.44$ M in an organic phase containing 2 M/l of
di-n-amylsulfoxide diluted in a mixture of equal volumes of tetrachlorethane and
tetrabromethane
Temperature: 25° C
Contact time: 1 minute
Separation factor: $\alpha = 1.0020$ (which corresponds at least to 1.0025 if account is
taken of the $UCl_4$ remaining in the aqueous phase)

EXAMPLE 8:

Liquid-liquid exchange using an amine as solvent $UCl_3 = 0.08$ M in 6 N HCl
$UCl_4 = 0.08$ M in the aliquat 336 diluted in the proportion
of 17% in toluene (the aliquat
336 is an industrial mixture of quaternary
ammoniums manufactured by GENERAL
MILLS, KANKAREE, Illinois)
Temperature: 22° C
Contact time: 1 minute
Separation factor: $\alpha = 1.0026$

EXAMPLE 9:

Aqueous phase-organic phase liquid-liquid exchange $UCl_3 = 0.7$ M in 7.25 N hydrochloric aqueous solution
$UCl_4 = 0.68$ M complexed by 50% tri-isobutylphosphate in kerosene R
Temperature: 25° C
Contact time: 1 minute
Separation factor: $\alpha = 1.0027$

EXAMPLE 10:

Aqueous phase - organic phase liquid-liquid exchange $UCl_3 = 0.7$ M in 8.2 N hydrochloric aqueous solution
$UCl_4 = 0.67$ M complexed by 50% tri-2-methylbutyl-phosphate
in dodecane
Temperature: 30° C
Contact time: 1 minute
Separation factor: $\alpha = 1.0027$

EXAMPLE 11:

Aqueous phase - organic phase liquid-liquid exchange $UCl_3 = 0.08$ M in 6 N hydrobromic acid
$UCl_4 = 0.08$ M in D$_2$EHPA (diethyl hexylphosphoric acid)
diluted to 30% in toluene
Ambient temperature
Contact time: 5 minutes
Separation factor: $\alpha = 1.0020$

Figure 10:
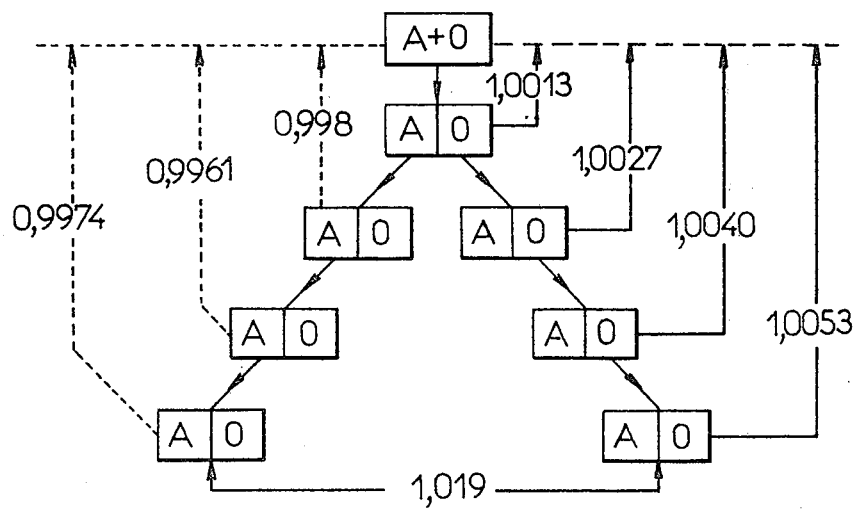
FIG. 10 is a diagram of the flow in a battery.

EXAMPLE 12:

Cascade of the Woodward type with four stages according to the system of FIG. 10

| Aqueous phase A: | $UCl_3 = 0.42$ M | HCl = 8 N |
|---|---|---|
| Organic phase O: | $UCl_4 = 0.42$ M | 50% TBP – 50% toluene |

The ratio of the richnesses of U 235 was measured at the different steps (see diagram); in particular, the ratio between the richness of the richest product in U 235 and the richness of the poorest product in U235 is equal to 1.0109, which corresponds to an average separation factor of 1.0027 per stage.

RIGHT HAND BRANCH:

The uranium contained in the organic phase O is divided into two parts; half is brought to valence III and subjected to the previously indicated conditions for the aqueous phase; the remainder is kept in the organic phase and a fresh contact is effected; the operation is repeated at each stage.

LEFT HAND BRANCH:

Identical operations but applied to the aqueous phases.

EXAMPLE 13:

Successive exchanges in a cascade of Hutchinson & Murphy type

A cascade with four plates was formed and four equilibrating operations were carried out, each being followed by a rotary transfer to approach equilibrium. The aqueous phase has the following characteristics:
0.4 M in U III and 8 N in HCl
The organic phase:
0.4 M in U IV, 50% TBP in benzene
The contact time of each operation was 5 minutes
Separation factor: $\alpha = 1.0026$.

EXAMPLE 14:

Successive exchanges in a cascade of the total reflux counter current type.

That is to say a "square" cascade with four stages according to FIG. 1, each of the contacts as well as the refluxes being effected step by step. Three rotations were effected. Isotopic analyses enabled the rise to equilibrium of such a cascade in total reflux to be followed, filled uniformly at the start with natural uranium. The phases had the following characteristics:

| Aqueous phase: | $UCl_3 = 0.4$ M | HCl = 8 N |
|---|---|---|
| Organic phase: | $UCl_4 = 0.4$ M | TBP = 50% in benzene |

Contact time for each operation: 5 minutes.

The various steps certainly resulted in enrichment according to theory, in particular the ratio of the end richnesses was 1.0080, which corresponds to $\alpha = 1.0026$.

All the particular embodiments described until now use liquid phase exchange. The invention may also use exchange between a solid phase and a liquid phase. The isotope exchange reaction is advantageously the same as in the preceding cases, that is to say that one of the phases contains preferentially valence III uranium and the other valence IV uranium; it is the latter which is enriched in light isotope.

The operational technique using solid supports (ion exchange resins for example) and enabling multiplication of the exchange is that of band displacement. The band displacement may be considered as being the meeting of two frontal analyses, one called direct at the head of the band, the other called reverse at the tail of the band. These two operations being symmetrical, there will be given an example of a direct frontal analysis. It is assumed that the conditions are such that U IV is fixed on the solid mass. Before any introduction of uranium, a compound capable of oxidizing U III to U IV is fixed on the solid phase in a quantitative manner and a solution of U III is introduced at the top of the column. In a short height of the solid phase, which is similar to a plate, U III in solution arriving in contact with the oxidizing compound will be fixed on the solid phase at the U IV state, provided that it has more affinity for the solid phase than the product obtained as a result of the reduction of the initial oxidizing compound. If the choice is suitable, a displacement in the first plate is effected. If, by transfer of solution, there is brought into this plate a new fraction of the supply solution, there will be isotopic exchange between the $U^{+4}$ fixed on the solid phase and the $U^{+3}$ in solution. Under such conditions of operation, it will be noted that, for a given height of solid phase, the first drop of uranium emerging will be depleted in U 235 all the more as the column is greater, whilst the last drop emerging will have the initial isotopic composition.

If the supply of uranium is interrupted once all the solid phase is saturated with U IV and if a reducer is supplied which converts U IV into U III and whose oxidation product has more affinity for the solid phase than U III, the phenomena which occur at the level of the theoretical plate can again be considered. It will thus be appreciated that, as the passage of the solution progresses, the U IV will emerge from the column in a more and more enriched form. A reverse frontal analysis will thus be effected.

Four types of frontal analysis can be considered in respect of the invention according as said analysis is direct or reverse and as the reflux which corresponds to the passage of uranium from one phase to the other by means of the oxidation-reduction reaction is of the oxidizing or reducing type.

Direct frontal analysis (DFA) with oxidizing reflux
Reverse frontal analysis (RFI) with reducing reflux
Direct frontal analysis (DFA) with reducing reflux
Reverse frontal analysis (FRA) with oxidizing reflux.

To effect a displacement as a band, two opposite frontal types are opposed, one oxidizing, the other reducing. There are hence two possibilities according as the oxidizing front is at the head or at the tail of the band:

DFA ox + RFI red
DFA red + RFI ox the choice of one or other of the two systems being made depending on practical reasons.

There must hence be used:

a medium wherein one of the valences is preferentially fixed;

two Red/ox compounds whose reaction product displaces uranium (reverse front) or is displaced by it (direct front) and whose reaction speed with the uranium is of the order of magnitude of the isotopic exchange speed.

Oxidation-reduction reactions may be carried out outside of the solid phase and the two operations in the reflux, i.e.:

the oxidation-reduction reaction, the passage of the uranium from one phase to the other, can be accomplished separately.

One then has a method called an external reflux, which is necessarily discontinuous. The phases coming into play in the method are liquid and solid phases, as previously described. The concentrations in the aqueous phase may vary between 0.01 and 1 mole/liter and in the resin phase between 0.1 and 1.5 mole per kg of dry resin.

Figure 11:
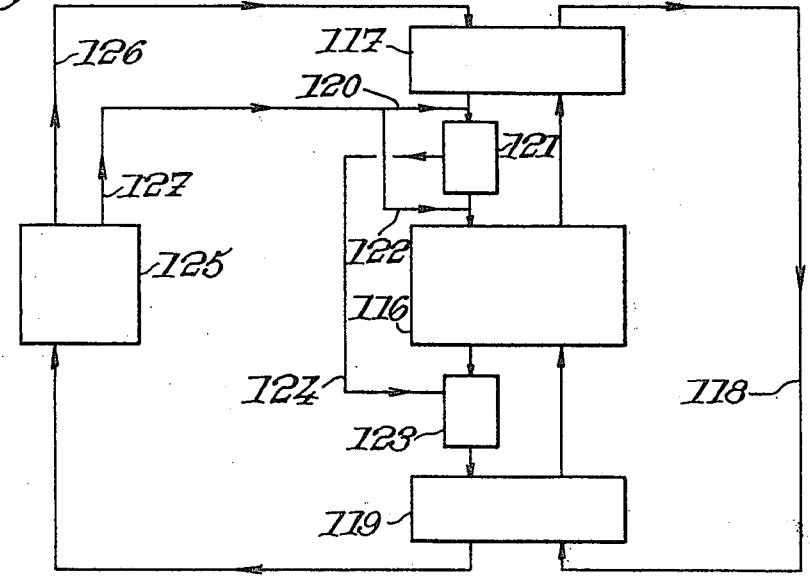
FIG. 11 is a diagram of liquid-slid isotope exchange between uranium III and uranium IV compounds.

There will now be described an example of a method with an external reflux. FIG. 11 shows diagrammatically an elemental cascade and its auxiliary elements in the case of an anionic resin.

The exchange section 116 is constituted by columns in series, the length of each resulting from optimisation taking into account the height of the theoretical plate, of the route of the enriched band brought into play.

The solid phase loaded with U IV emerging from the exchange section 116 goes into the rich reflux 117. In the case of a strong anionic resin (FIG. 11), a slightly acid aqueous phase (0.5 N HCl) displaces uranium IV from the resin. The solid phase freed of uranium IV goes through 118 into the poor reflux 119 where it is loaded with uranium IV before returning to the exchange section 116. The liquid phase emerging from the rich reflux 117 is acidified through 120 before passing into the reducer 121. The reduction of the valence IV to the valence III is effected by chemical or electrochemical route. After acidification through 122, the liquid phase passes through the exchange section 116. It is then oxidized at 123 by any known method, such as previously described, for example by chlorine coming through 124 of the electrolyser 121. This liquid phase passes through the poor reflux 119 where it yields its uranium to the solid phase. The liquid phase then goes into the deacidifier 125. There emerges therefrom on one hand, a slightly acid aqueous solution which is sent through 126 to the rich reflux and on the other hand, a solution of HCl through 127.

A solution of U III being very sensitive to the presence by any substance capable of oxidizing it, it is necessary not only that the purity conditions of the solution with respect to dangerous substances be ensured to preserve the stability of the U III. The resin should be maintained in such a purity condition as well. Should commercial resins be used, they should be carefully freed of the oxidizing groups which they contain peroxides which have served as polymerisation catalysts as well as impurities fixed on the resin, particularly products resulting from attack of metallic components of the installation, etc... in the course of the manufacture of said resins.

The following example shows the unitary effect obtained:

Uranium IV was fixed on a strong anionic resin in a 8 N HCl medium. This resin, similar to DOWEX 2X10 resins, has been manufactured from a matrix obtained by copolymerisation of styrene and divinylbenzene and fixation thereon of exchange groups bearing quaternary ammonium groups, and has then been purified. The resin with U IV fixed thereon was then contacted with a solution of uranium III in the same medium and in equal amount. The uranium was recovered separately from each of the phases, the uranium IV being eluted from the resin by weakly acidified water. The ratio of the isotopic richnesses of each of the two fractions obtained is: 1.0024.

There can also be used, at least for unitary exchanges, a cation exchange resin with moderate cross-linking, constituted by a polystyrene structure cross-linked with divinyl-benzene, with active sulphonic groups grafted thereon. The resin obtained is comparable to the DOWEX 50 WX8 resin, but is free of oxidizing impurities. $U^{+3}$ was fixed on the resin in $H_2SO_4$ medium of 0.5 acidity. This resin was placed in contact for about two hours with a solution of uranium IV in equal amount, then the uranium was recovered separately from each of the phases; the ratio of the richnesses was measured; the value found was $\alpha = 1.0020$.

Industrial installations can have generally the same constitution as certain of those using the exchange $U^{+4} - U^{+6}$, already described in the documents mentioned above.

In the Figures and in the examples, it is not always specified if the supply, the production and the removal are ensured through the aqueous or organic phase. In fact this is immaterial. In the same way, the points of introducing and withdrawing rich and poor materials can be differently placed.

In general, it must be understood that the scope of the present patent extends to modifications of all or part of the features described within the scope of equivalents.

I claim:

1. A process for producing, from a source of uranium containing at least two isotopes, a product containing uranium enriched with respect to said source in one of said isotopes, comprising the steps providing from said source uranium in valence state III and uranium in valence state IV, uranium in at least one of said valence states being provided in a liquid phase, contacting for isotopic exchange said uranium III with said uranium IV, said contacting effectuating exchange of isotopes between uranium III and uranium IV to enrich the uranium IV in the lighter of said isotopes, and to enrich the uranium III in the heavier of said isotopes, while maintaining said uranium III free of contact with oxidizing conditions effective in oxidizing uranium III to uranium IV, segregating the uranium IV resulting from said contacting from the uranium III resulting from said contacting.

2. A process according to claim 1 including the steps
incorporating the uranium IV resulting from said contacting predominantly into a first phase while incorporating the uranium III resulting from said contacting into a second phase and separating said first and second phases to segregate products respectively enriched in the lighter and in the heavier of said isotopes.

3. A process according to claim 1 wherein said uranium III is provided in an aqueous solution containing hypouranous ions $U^{+3}$ including the steps
maintaining said aqueous phase at least during said contacting free of contact with electrically conductive bodies and maintaining at least during said contacting the concentration in said aqueous phase of metallic ions other than uranium of groups III to VIII of the periodic table below the level for effectively catalyzing the oxidation of uranium III during the period of said contacting.

4. A process according to claim 3, wherein the aqueous solution is a mineral acid solution with concentration in the range from 4N to 9N.

5. A process according to claim 4, wherein the aqueous solution contains an acid HX, where X is a halogen.

6. A process according to claim 5, wherein the aqueous solution is a H Cl aqueous solution and the $U^{+3}$ ions are present as hypo-uranous chloride $UCl_3$.

7. A process according to claim 4, wherein the U III is provided in an aqueous phase is with a concentration from 0.1 to 2 M and the U IV is provided in an organic phase is with a concentration of from 0.1 to 1 M.

8. Process according to claim 3, which comprises maintaining the content of the aqueous phase in metallic ions of the groups III to VIII of the periodical table below 1 ppm with respect to uranium III.

9. A process for isotopic enrichment of uranium containing a plurality of isotopes with respect to a lighter one of said isotopes, comprising the steps of forming from said uranium an organic phase in which uranium is present as U IV; subjecting said organic solution to multistage isotopic exchange with an aqueous hydrochloric solution of $U^{+3}$ ions in a counter-current cascade arrangement, extracting the isotopically enriched U IV from the organic solution after the last stage of the cascade into an aqueous phase resulting from depletion of the aqueous solution flowing out of the first stage of the cascade; reducing the uranium present in the resultant aqueous solution from valence IV to valence III, and re-introducing the aqueous phase containing U III into the last stage of the cascade; and, conversely, oxidizing the isotopically depleted uranium III contained in the aqueous solution flowing out of the first stage of the cascade, and transferring it into the uranium IV depleted organic solution for introduction into the last stage of the cascade.

10. A process for isotopic enrichment of uranium initially containing a plurality of isotopes which comprises:
forming from said uranium an aqueous hydrochloric solution 4 N to 9 N of both a first compound of uranium of valence state III and a second compound of uranium of valence state IV and digesting said solution;

selectively extracting said uranium IV compound substantially completely from said aqueous solution into an organic phase;

collecting the U IV-depleted U III-loaded aqueous phase and splitting it into a concentrated U III loaded hydrochloric aqueous phase and a low acidity aqueous phase having a low uranium content;

re-extracting said U IV from said organic phase into said uranium depleted aqueous phase;

acidifying the U III-loaded aqueous low acidity hydrochloric solution to a normality between 4N and 9N;

directing said acidified aqueous solution to the following stage in a multistage cascade arrangement;

and directing said concentrated U IV depleted aqueous solution to the preceeding stage of the cascade.

11. In a process for producing from a source of uranium containing at least a lighter and a heavier isotope a product containing uranium enriched with respect to said source in one of said isotopes, the steps
providing from said source an aqueous acid phase containing hypouranous ions $U^{+3}$, and a salting out agent for uranous uranium, the concentration of metallic ions other than uranium of groups III through VIII of the periodic table in said aqueous phase being less than required to catalyze oxidation of said hypouranous ions providing a water-immiscible liquid phase containing an organic complex of uranium in valence state IV intimately contacting said aqueous and said water-immiscible phase to effect isotope exchange enriching the uranium in valence state IV in the lighter of said isotopes while enriching the hypouranous uranium in the heavier of said isotopes, said phases being maintained out of contact with electrically conductive structures, separating said water-immiscible phase from said aqueous phase to provide product enriched in said lighter isotope.

12. A process according to claim 11, wherein the organic phase comprises uranium IV complexed by a solvent selected from the group consisting of alkylphosphates $(RO)_3P(O)$ and $ROR'OR''OP(O)$, phosphinoxides $RR'R''P(O)$, phosphonates $ROR'OR''P(O)$ and phosphinates $ROR'R''P(O)$, where R, R' and R'' are linear and branched aliphatic or aromatic carbon chains, two of which do not contain more than eight carbon atoms, the third of which containing up to twelve carbon atoms.

13. A process according to claim 12, wherein the solvent is selected from the group consisting of tributylphosphate, tri-isobutylphosphate, tri-propylphosphate, triethyl-12-butylphosphate, tri-2-methylbutylphosphate, tri-2-ethylbutylphosphate, tri-2-methylamylphosphate, tributoxyethylphosphate, tri-octylphosphine oxide, tributylphosphine oxide, di-N-propylmethoxyoctylphosphine oxide, di-N-butylethyl-2-methoxy-isobutylphosphine oxide, di-isobutylmethoxymethyloctylphosphine oxide, trihexylphosphine oxide, dibutylbutylphosphonate, di-isobutylphosphonate, di-octyloctylphosphonate, diisobutylbutylphosphonate, dibutyl-isobutylyphosphonate, di-isoamylamylphosphonate, di-isopropylbutylphosphonate, di-isobutylhexylphosphonate, di-isobutyliso-amylphosphonate, di-isobutyloctylphosphonate, di-isobutylethylhexylphosphonate, di-isobutyl-methoxylaurylphosphonate, di-isobutylphosphinate, di-hexylhexylphosphinate, dibutyl-isobutylphosphinate, diisobutylbutylphosphinate, di-hexyl-isobutylphosphinate, di-octyl-isobutylphosphinate.

14. A process for producing from a source of uranium containing at least a lighter and a heavier isotope two products containing uranium isotopically enriched in the respective isotopes comprising
 a. providing from said source an organic liquid phase loaded with uranium in valence state IV and an aqueous phase loaded with hypouranous ions, $U^{+3}$,
 b. passing said phases countercurrently through a multistage, cascade exchanger having at its first end an influx of said aqueous phase and an effluent of said organic phase and at its second end an effluent of said aqueous phase and an influx of said organic phase, to effect isotopic enrichment in the lighter isotope in the U IV in the organic phase effluent and isotopic enrichment in the heavier isotope in the uranium in the aqueous phase effluent
 c. extracting the uranium from said organic effluent to form a uranium depleted organic phase,
 d. reducing the uranium extracted from said loaded organic effluent to form hypouranous ions,
 e. extracting the hypouranous ions from said aqueous effluent to form a uranium-depleted aqueous phase,
 f. oxidizing the uranium extracted from said aqueous effluent to form U IV,
 g. loading the hypouranous ions formed in step d into the uranium depleted aqueous phase formed in step e to provide the aqueous influx into said exchanger,
 h. loading the U IV formed in step f into the uranium depleted organic phase formed in step c to provide the organic influx into said exchanger.

15. A process as claimed in claim 14 wherein said aqueous phase loaded with hypouranous ions is free of metals other than uranium from groups III through VIII of the periodic table at levels effective in catalyzing oxidation of U III to U IV and maintained out of contact with electrical conducting structure.

16. A multistage process for effecting isotopic enrichment between uranous uranium U IV and hypouranous uranium U III, which comprises repeating a plurality of times to produce enrichment of the uranium in the 235 U isotope in an isotopic exchange section, a cycle which comprises the steps of:
 a. countercurrent isotopic exchange between $^aU^{+3}$ loaded aqueous phase and a U IV loaded organic phase in an isotopic exchange section, said isotopic exchange being effected under conditions which exclude transfer of uranium in either valence state from one phase to the other,
 b. extracting U IV by an uranium-depleted aqueous phase from the U IV loaded, 235 U enriched, organic phase resulting from the exchange of step a,
 c. chemically reducing $U^{+4}$ contained in the aqueous phase resulting from step b into $U^{+3}$ and introducing the resulting aqueous phase into said section as said $U^{+3}$ loaded aqueous phase,
 d. oxidizing $U^{+3}$ contained in the $U^{+3}$ loaded 238 U enriched aqueous phase resulting from step a into $U^{+4}$,
 e. extracting $U^{+4}$ from the aqueous phase resulting from step d into the uranium depleted organic phase resulting from step b and introducing the resultant uranium loaded organic phase into said section as the U IV loaded organic phase of step a.

17. Process according to claim 16, in which a salting out agent of $U^{+4}$ is introduced into the aqueous phase containing $U^{+3}$, before said isotopic exchange and wherein said salting out agent is removed from the aqueous phase subsequent to said isotopic exchange and before re-extracting therewith U IV from the organic phase in the next cycle.

18. Process according to claim 17, wherein U III and U IV are in the form of their chlorides $UCl_3$ and $UCl_4$ respectively, wherein the salting out agent is hydrochloric acid, said hydrochloric acid being introduced into the aqueous phase before the isotopic exchange and distilled from the aqueous phase after the transfer of the re-oxidized uranium from the aqueous phase into the organic phase.

* * * * *

UNITED STATES PATENT AND TRADEMARK OFFICE
CERTIFICATE OF CORRECTION

PATENT NO. : 4,012,480
DATED : March 15, 1977
INVENTOR(S) : Pierre Delvalle

It is certified that error appears in the above-identified patent and that said Letters Patent are hereby corrected as shown below:

Col. 1, line 10, after "become", "or" should be --of--;

Col. 1, line 57, "$U^{+3}U^{+4}$" should be --$U^{+3}/U^{+4}$--;

Col. 3, line 56, "be" should be --for--;

Col. 5, line 3, "$\rightarrow U + {}^4$ and $H + \rightarrow H_2$" should be as follows:
$\rightarrow U^{+4}$ and $H^+ \rightarrow H_2$ Col. 5, line 25, "phase", first occurrence, insert -- phases--

Col. 5, line 47, delete "may be" second occurrence;

Col. 6, line 25, "n" should be --<u>n</u>--;

Col. 7, line 58, after "$UCl_4$", insert the following words: "it will be possible in practice to arrive at 0.5 M/l"

Col. 9, line 25, "slid" should be --solid--;

Col. 9, line 49, "$R_n$.'" should be --$R_n$. β--;

Col. 9, line 60, "flowrates" should be --flow-rates--;

Col. 10, line 56, "or" should be --of--;

UNITED STATES PATENT AND TRADEMARK OFFICE
CERTIFICATE OF CORRECTION

PATENT NO. : 4,012,480
DATED : March 15, 1977
INVENTOR(S) : Pierre Delvalle

It is certified that error appears in the above-identified patent and that said Letters Patent are hereby corrected as shown below:

Col. 11, line 15, "withdrawl" should be --withdrawal--;

Col. 11, line 40, "or" should be --of--;

Col. 12, line 43, delete "U.S.";

Col. 13, line 63, "p" should be --$\underline{p}$--;

Col. 15, line 23, after "centrifuges", delete the semicolon and add a comma instead;

Col. 15, line 27, "comprises" should be --comprise--;

Col. 17, line 62, "hydrchloric" should be --hydrochloric--;

Col. 19, line 3, "alreadjy" should be --already--;

Col. 19, line 58, "R/(60%)" should be --R (60%)--;

Col. 20, line 11, "di-isolbutylphosphonate" should be -- di-isobutylphosphonate --.

Col. 21, line 20, "(diethyl hexylphosphoric acid)", should be the following:

"(diethyl$_2$hexylphosphoric acid) diluted to 30% in toluene";

UNITED STATES PATENT AND TRADEMARK OFFICE
CERTIFICATE OF CORRECTION

PATENT NO. : 4,012,480
DATED : March 15, 1977
INVENTOR(S) : Pierre Delvalle

It is certified that error appears in the above-identified patent and that said Letters Patent are hereby corrected as shown below:

Col. 25, line 42, after "phase", delete "is";

Col. 26, line 24, "preceeding" should be --preceding--.

Signed and Sealed this twenty-sixth Day of July 1977

[SEAL]

Attest:

RUTH C. MASON
*Attesting Officer*

C. MARSHALL DANN
*Commissioner of Patents and Trademarks*